Figure 1:
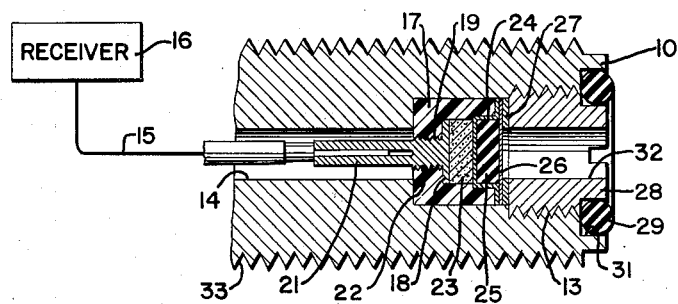

Aug. 25, 1964  J. M. MARSHALL  3,146,360
PIEZOELECTRIC TIME-OF-ARRIVAL GAGE
Filed April 7, 1961

*INVENTOR.*
J. M. MARSHALL
BY
ATTYS.

United States Patent Office 3,146,360
Patented Aug. 25, 1964

3,146,360
PIEZOELECTRIC TIME-OF-ARRIVAL GAGE
John M. Marshall, Hyattsville, Md., assignor to the United States of America as represented by the Secretary of the Navy
Filed Apr. 7, 1961, Ser. No. 101,600
5 Claims. (Cl. 310—8.7)
(Granted under Title 35, U.S. Code (1952), sec. 266)

The invention described herein may be manufactured and used by or for the Government of the United States of America for governmental purposes without the payment of any royalties thereon or therefor.

This invention relates to detection of compressional waves and more particularly to detection of high temperature explosive compressional waves as are encountered in a shock tunnel. A shock tunnel is a device used for testing the aerodynamic properties of air frame models and such. A column of air is located within a barrel having breakable diaphragms at both ends thereof. At one end of this barrel is located an explosive chamber attached to the barrel; and at the other end, thereof, is located the airplane model or other aerodynamic shape to be tested. A charge exploded within the chamber breaks the diaphragm at that end, compresses the air within the barrel thus breaking the diaphragm at the other end thereof, and forces the column of air at high speed against the model. The shock waves produced thereby and the explosive gases escaping from the barrel possess a high temperature and shock quality to which the model and the surrounding equipment must be subjected. It is necessary in the operation of such a shock tunnel to provide detectors of the shock wave in order to operate recording mechanisms and determine the speed of such waves. Such detectors are mainly used singly to detect the shock arrival at any particular point or in pairs separated by known intervals and connected to proper computing or recording mechanisms to determine the velocity of such a shock wave.

Prior to the development of this invention, two different devices were used as detectors. The first of these were the ionization probes which are basically switches that are operated in part through the conducting ionized gas associated with the shock wave front. The ionization probe was found to produce unreliable data at low shock velocities. This was due to the fact that at such low velocity gas does not become sufficiently ionized for proper operation and detection by the probe. The second of these devices was a commercial gage which consisted of a piezoelectric transducer embedded in an epoxy resin. Use of a commercial gage produced more reliable data; however, the transducer section of these gages was completely destroyed after several operations due to the high temperatures and pressures encountered in use of the shock tunnel. The cost of these gages is relatively high and their rapid destruction was extremely costly. Attempts were made to use other commercial gages which were capable of withstanding the temperatures and pressures encountered, but these gages were found to have such low response times as to make their use impracticable.

An object of this invention is to provide an improved shock wave detector or time-of-arrival gage having a very high response time, consistent reliability over a wide range of shock velocity, the ability to withstand high temperatures and pressures without damage, a reasonably high signal to noise ratio, and a relatively inexpensive cost when computed on a cost per shot basis.

A further object of this invention is to provide a time-of-arrival gage for use with a shock tunnel device to sense the exact time that a shock wave arrives at a particular point and from which component parts may easily be removed and replaced thereby providing for ease of repair and maintenance.

Still another object of this invention is to provide a shock wave detector using a material such as barium titanate, which because of its high natural frequency has the proper response time and desired reliability, and having sufficient means for protecting the barium titanate from extreme heat and pressure which may be encountered.

Various other objects and advantages will be apparent from the following description of one embodiment of the invention, and the novel features will be particularly pointed out hereinafter in connection with the appended claims.

Figure 2:
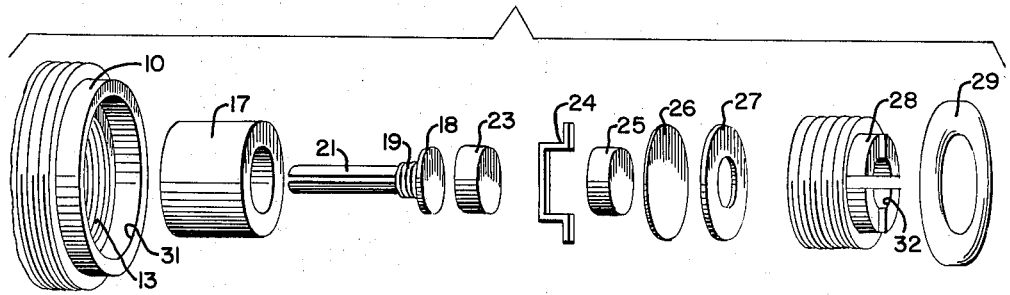

In the accompanying drawing:

FIG. 1 illustrates a cross section of an assembled time of arrival gage which has been constructed in accordance with this invention; and FIG. 2 illustrates the device shown in FIG. 1 with the parts disassembled but remaining in proper order.

In the embodiment of the invention illustrated in FIGS. 1 and 2, a body or casing 10 having a bore 11 therein is made of a heat conducting material, such as steel or other metal having sufficient strength. The bore 11 constitutes a hollow section within the body 10 with the front end of the bore having threads 13 at its open end. An opening 14 is shown at the rear of said bore 11 through which an output conductor 15 may be connected to an external recording or computing device shown generally as receiver 16. A cup-shaped electrical insulator 17 of a polymerized tetrafluoro ethylene synthetic plastic or other solid insulating material suitable for the purpose is placed within the rear of the bore with its open end facing the front of the bore. Within the cup-shaped insulator is placed a platform type electrode 18 having a threaded section 19 on its stem 21 to be engaged by the threaded hole 22 at the bottom of the cup-shaped insulator. Abutting the platform electrode 18 is a disc shaped piezoelectric crystal 23, such as barium titanate, of the same diameter as the platform electrode. A flat, narrow grounding electrode 24 is placed abutting the opposite face of the crystal 23 and pressed into contact therewith by the neoprene heat barrier 25. The grounding electrode 24 extends between the wall of the insulator and over the lip of the cup to be attached to the conductive body to thereby electrically ground that face of the piezoelectric crystal. The disc shaped neoprene heat barrier 25 is of equal diameter with the crystal and of such thickness as to completely fill the remaining space within the cup.

A diaphragm made of a metal to serve as a heat conductor is placed so as to cover the entire flat surface formed by the lip of the cup 26 and the neoprene barrier 25. A hollow metal washer 27 is placed between the diaphragm and a hollow insert 28 to press the diaphragm edges against the lip of the insulator cup. The hollow insert 28 having a threaded section thereon to engage the threads 13 at the open end of the bore 11 is inserted in the bore, so that the aforedescribed elements are sealed tightly within the bore to thereby maintain close physical contact between those elements. An O-ring 29 is placed in a groove 31 formed in the insert and the body adjacent thereto to seal the body in position.

In operation, the time-of-arrival gage is placed in such a position that the open end of the bore will communicate with the advancing shock wave. When the shock wave enters the bore, the wave will pass through the hollow portion 32 of the insert as well as the hollow portion of the washer 27 and impinge upon the diaphragm 26 causing deflection of the diaphragm face. The energy of the shock wave is transmitted from the diaphragm face to the solid heat barrier 25 which is compressed and in turn compresses the piezoelectric crystal 23 thereby resulting in the generation of a signal voltage between the platform electrode 18 and the grounding electrode 24 by the piezoelectric action of the crystal. The neoprene heat barrier 25 further provides an acoustic damping action, which is effective to substantially damp the noise vibrations which may be encountered. This inherent damping action of the neoprene does not substantially effect the vibrations received from the shock wave so that the overall effect is to increase the signals-to-noise ratio of the detector.

A high temperature accompanying any shock wave sensed by this detector does not substantially affect the operation of the transducer element since any excess heat reaching the diaphragm surface 26 is conducted along the surface thereof through the copper washer 27 to the threaded retainer 28, and thence to the body of the detector 10. The heat barrier 25 in turn thermally insulates the diaphragm 26 from the electrodes 18 and 24 and the piezoelectric crystal 23 without adversely affecting the rapid transmission of the shock wave to the crystal. In addition to the heat barrier 25 at the forward end of the cup, the electrical insulator cup 17 itself provides a certain amount of thermal insulation between the sides of the crystal and the surrounding steel body. The body of the detector may have threads 33 thereon in order to more effectively and quickly radiate the heat from the body to a larger body such, for example, as the wall of a shock tunnel to which the detector is secured and to securedly mount the detector on the larger body.

The output appearing on the platform electrode 18 is a voltage resulting from the compression of the crystal 23, which may be fed to a high impedance cathode follower or whatever circuitry is appropriate to the particular application desired. In obtaining this output voltage, it should be noted that the same pressure wave which the gage detects is itself the mechanism by which electrical connection and physical contact between the crystal and the electrodes is assured.

Any repairs or replacements of the components may easily be accomplished simply by unscrewing the threaded insert 28 which holds the components in place within the bore. Thereafter, the parts are easily reassembled and replaced without so much as a single soldering operation, yet the construction of the device provides a shock wave detector highly resistive to the adverse effects of high temperature and high velocity shock waves.

It will be understood that various changes in the details, which have been herein described and illustrated in order to explain the nature of the invention, may be made by those skilled in the art, within the principles and scope of the invention as expressed in the appended claims.

What is claimed is:

1. A time-of-arrival gage comprising; a body of heat conducting material having a bore therein with an external opening at one end thereof, a pair of electrodes, one of said electrodes being connected to an output terminal, a piezoelectric crystal disposed between said pair of electrodes and in electrical contact therewith, said one of said electrodes and said piezoelectric crystal being electrically insulated from said body, a solid heat barrier means disposed between the other of said electrodes and said opening in said bore providing both a thermal insulation to said crystal and an acoustic damping of noise vibrations for increasing the signal-to-noise ratio, and a diaphragm of heat conducting material disposed between said opening and said heat barrier means for transmitting therethrough a shock wave entering said bore and conductively related to said body for dissipating a portion of the heat energy of the shock wave, securing means for holding said electrodes, said piezoelectric crystal, said heat barrier, and said diaphragm in tight physical contact between adjacent elements within said bore, whereby the shock wave entering said bore causes an electrical sginal voltage to be produced at said output terminal.

2. The device of claim 1 in which said heat barrier means comprises a neoprene disc, said neoprene disc providing thermal insulation and acoustic damping to the passage of said shock wave.

3. The device of claim 1 in which said electrodes, said piezoelectric crystal, and said heat barrier means are contained within a cup-shaped insulator, said insulator being composed of polymerized tetrafluoro ethylene.

4. The device of claim 1 in which said securing means is a threaded hollow insert, said bore contains a threaded section at the open end thereof in which said hollow insert is secured.

5. A time-of-arrival gage comprising a body of heat conductive material with a hollow section therein, said hollow section having an open end at the front portion thereof, detecting means for producing an output voltage in response to compressional forces thereon, said detecting means being disposed at the rear portion of said hollow section, heat barrier means in physical contact with said detecting means for thermally insulating the detecting means from said body and said open end of said bore and providing an acoustic damping of noise vibrations for increasing the signal-to-noise ratio of said detecting means, heat conducting means in physical contact with said heat barrier means and in thermally conductive relation with said body for transmitting therethrough the compressional forces and for dissipating a portion of the heat energy of the compressional forces, said conductive means being disposed between said open end and said heat barrier means to conduct heat at the front of said bore to said body, whereby a compressional wave entering said bore travels through said heat conductive means and said heat barrier to said detecting means, and heat within said bore is prevented from reaching said detecting means.

References Cited in the file of this patent
UNITED STATES PATENTS

| | | |
|---|---|---|
| 2,096,826 | Schrader | Oct. 26, 1937 |
| 2,842,686 | Musser et al. | July 8, 1959 |
| 3,031,591 | Cary et al. | Apr. 24, 1962 |